US011680701B2

(12) United States Patent
Dieser

(10) Patent No.: US 11,680,701 B2
(45) Date of Patent: *Jun. 20, 2023

(54) SYSTEM, APPARATUS, AND METHOD FOR THERMAL REGULATION IN A TIERED RACK GROWTH SYSTEM

(71) Applicant: Mark Dieser, Rochester, MN (US)

(72) Inventor: Mark Dieser, Rochester, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/643,049

(22) Filed: Dec. 7, 2021

(65) Prior Publication Data

US 2022/0099285 A1 Mar. 31, 2022

Related U.S. Application Data

(63) Continuation of application No. 16/946,066, filed on Jun. 4, 2020, now Pat. No. 11,215,352.

(60) Provisional application No. 62/856,921, filed on Jun. 4, 2019.

(51) Int. Cl.
*F21V 29/58* (2015.01)
*A01G 7/04* (2006.01)
*F21Y 115/10* (2016.01)
*F21V 21/088* (2006.01)
*F21V 21/34* (2006.01)
*F21S 4/20* (2016.01)
*F21V 29/507* (2015.01)

(52) U.S. Cl.
CPC .............. *F21V 29/59* (2015.01); *A01G 7/045* (2013.01); *F21V 29/58* (2015.01); *F21S 4/20* (2016.01); *F21V 21/088* (2013.01); *F21V 21/34* (2013.01); *F21V 29/507* (2015.01); *F21Y 2115/10* (2016.08)

(58) Field of Classification Search
CPC .......... F21V 29/59; F21V 29/58; F21V 29/56; F21V 29/507; F21V 29/713; F21V 29/10; F21V 29/717; F21V 29/57; F21V 17/104; F21V 17/06; F21V 17/005; F21V 19/0075; F21V 21/08; F21V 21/34; F21V 21/088; F21V 21/116; F21V 21/025; F21V 21/005; F21V 21/108; A01G 7/045; F21S 4/20; F21S 2/005; F21K 9/275
See application file for complete search history.

(56) References Cited

U.S. PATENT DOCUMENTS

| | | | | |
|---|---|---|---|---|
| 5,973,331 A * | 10/1999 | Stevens | ..................... | F26B 3/28 |
| | | | | 250/492.1 |
| 7,959,334 B2 * | 6/2011 | Tsai | ......................... | F21S 4/28 |
| | | | | 362/396 |
| 8,651,704 B1 * | 2/2014 | Gordin | .................... | F21V 29/60 |
| | | | | 362/373 |

(Continued)

*Primary Examiner* — Jong-Suk (James) Lee
*Assistant Examiner* — James M Endo
(74) *Attorney, Agent, or Firm* — Dunlap Sennett & Ludwig, PLLC

(57) ABSTRACT

A system, apparatus, and method for thermal regulation in a tiered rack growth system. A contact heat exchange converter is provided to remove thermal energy of a light fixture for the tiered rack growth system. A contact thermal exchange cavity defined in the contact heat exchange converter is dimensioned to cooperatively receive an arcuate thermal sink of the light fixture. A circulation conduit communicates a dense medium coolant to remove thermal energy carried by a thermal mass of the contact heat exchange converter.

10 Claims, 4 Drawing Sheets

(56) References Cited

U.S. PATENT DOCUMENTS

| | | | |
|---|---|---|---|
| 9,752,766 B2* | 9/2017 | Stanley | A01G 9/249 |
| 11,215,352 B2* | 1/2022 | Dieser | F21V 29/59 |
| 2013/0000185 A1* | 1/2013 | Tanase | A01G 9/249 |
| | | | 362/249.02 |
| 2016/0356460 A1* | 12/2016 | Lu | F21V 23/06 |

* cited by examiner

SYSTEM, APPARATUS, AND METHOD FOR THERMAL REGULATION IN A TIERED RACK GROWTH SYSTEM

CROSS-REFERENCE TO RELATED APPLICATION

This application is a continuation of U.S. patent application Ser. No. 16/946,066, filed Jun. 4, 2020, and claims the benefit of priority of U.S. provisional application No. 62/856,921 filed Jun. 4, 2019, the contents of which are herein incorporated by reference.

BACKGROUND OF THE INVENTION

The present invention relates to lighting systems, and more particularly to thermal regulation of lighting systems and surrounding environment.

As Cannabis Growers attempt to maximize their space volume to produce as much product per unit volume of space, the Tiered Racking System layers move closer and closer together. This close proximity of one tier to another has created a challenge for the industry in providing sufficient cooling to the Tiered space while simultaneously reducing tier level distances and allowing the plants to grow closer to the LED lights.

In some cases, plant leaves are inches from touching the surface of the light fixture during flowering. This maximized combination of close Tiers and plant growth which is what the growers want. However, this inhibits the airflow that can pass by the lights to cool the external surface of the lights, negatively impacting the ambient temperature conditions that can be maintained satisfactorily near the plants.

Cooling air flow volume can change dramatically from grower to grower depending on the minimum temperature of air that is acceptable to pass by the leaves on the plants. Limiting this minimum temperature directly impacts the air volume that is required to achieve the heat removal of the HVAC system supporting the Tiered Rack cooling. As the supply air temperature entering the space to cool the lighting is increased to reduce stress on the plants, the air volume increases linearly with each degree of supply air temperature rise. As more Tiers are added to a given volume, the cooling air flow volume thus becomes a limiting factor in the Tiered grow room successful operation.

As can be seen, there is a need for improved systems, apparatus, and methods for thermal regulation in an illuminated growth environment.

SUMMARY OF THE INVENTION

In one aspect of the present invention, a contact heat exchange converter for removing thermal energy of a light fixture in a tiered rack growth system is disclosed. The contact heat exchange converter includes an elongate body having a first end, a second end, a top, and a bottom. A flange protrudes from the top of the elongate body and extends along a longitudinal length of the elongate body. A left and a right arcuate divergent side arm extend downwardly and outwardly from the top of the elongate body and extend along the longitudinal length of the elongate body. The left and the right arcuate side arms define a contact thermal exchange cavity that is adapted to mount the light fixture therein. A thermal sink of the light fixture is held in contact with an inner surface of the contact thermal exchange cavity. A fluid conduit extends through the top of the elongate body and is adapted to receive connections to a dense medium coolant source for circulation of a dense medium coolant through the elongate body.

In some embodiments, a keyed protrusion extends from the flange. The keyed protrusion is adapted to couple to with a corresponding slot of a mounting clip to secure the contact heat exchange converter with a bottom surface of a tier shelf of the tiered rack growth system.

In some embodiments, a center post protrudes from an apex of the contact thermal exchange cavity. The center post adapted to couple with a slot defined in the thermal sink of the light fixture.

In other embodiments, the elongate body increases a thermal mass of the light fixture by at least 7.53 lbm.

In yet other embodiments, the elongate body increases a thermal mass of the light fixture by at least 8.94 lbm.

In other aspects of the invention, a tiered rack growth system is disclosed. The tiered rack growth system includes a light fixture having an arcuate thermal sink defined in top surface thereof. A contact heat exchange converter has a contact thermal exchange cavity defined by a left and a right arcuate divergent side arm extend downwardly and outwardly from a top of the contact heat exchange converter. The contact thermal exchange cavity is dimensioned to cooperatively receive the arcuate thermal sink in contact with an inner surface of the contact heat exchange converter. A circulation conduit extends through the top of the contact heat exchange converter is adapted to receive connections to a dense medium coolant source for circulation of a dense medium coolant through the contact heat exchange converter.

In some embodiments, a coolant circulation pump is in communication with the circulation conduit. The coolant circulation pump is configured to circulate the dense medium coolant through the circulation conduit such that a 1° F.-2° F. temperature differential is held across the contact heat exchange converter.

In some embodiments, a fluid circulation feed line is in fluid communication between the circulation conduit and the coolant circulation pump.

In other embodiments, a keyed protrusion extends from a flange defined along the top of the contact heat exchange converter. A mounting clip is adapted to attach to a bottom surface of a tier shelf. The mounting clip has a keyed slot to cooperatively receive the keyed protrusion to secure the contact heat exchange converter to the tier shelf.

In yet other embodiments, a post extends along a longitudinal axis of the contact thermal exchange cavity. A slot extends along a longitudinal length of the light fixture. The slot is configured to receive the post to secure the light fixture within the contact thermal exchange cavity.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention.

Figure 1:
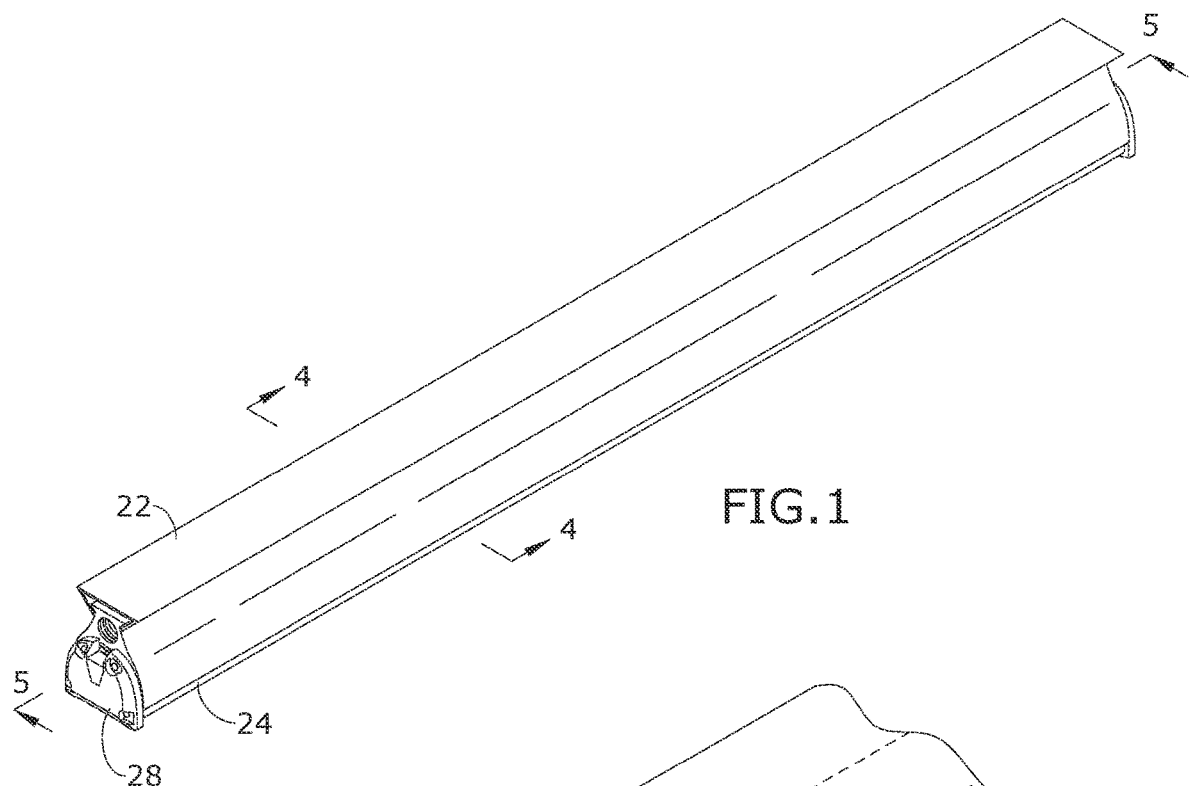
FIG. 1 is a perspective view of the contact heat exchange converter.
Figure 2:
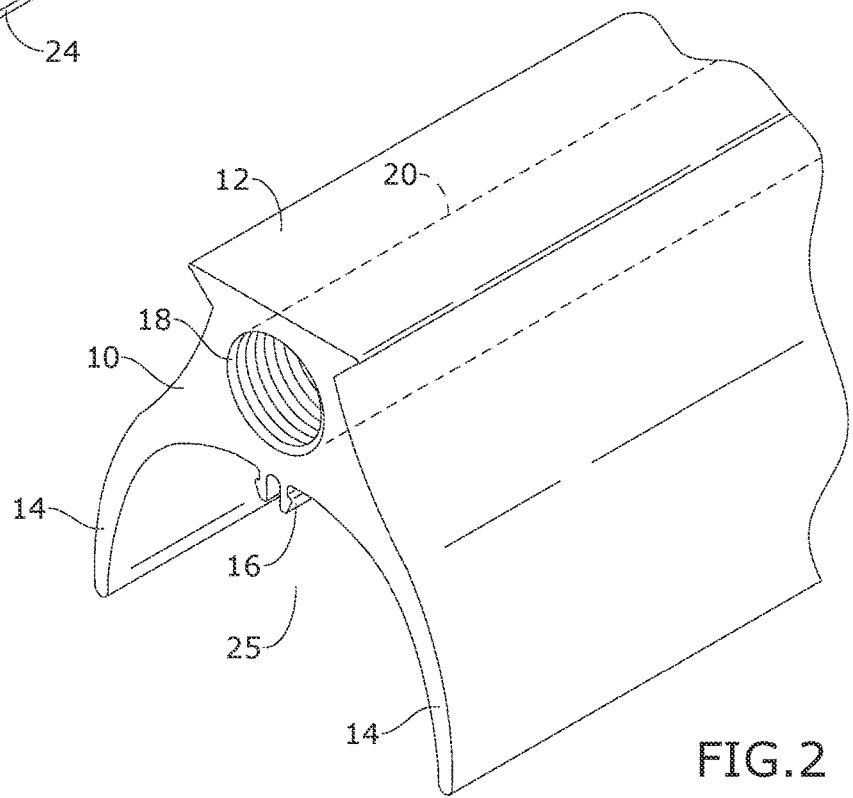
FIG. 2 is a detail perspective view of the contact heat exchange converter.
Figure 3:
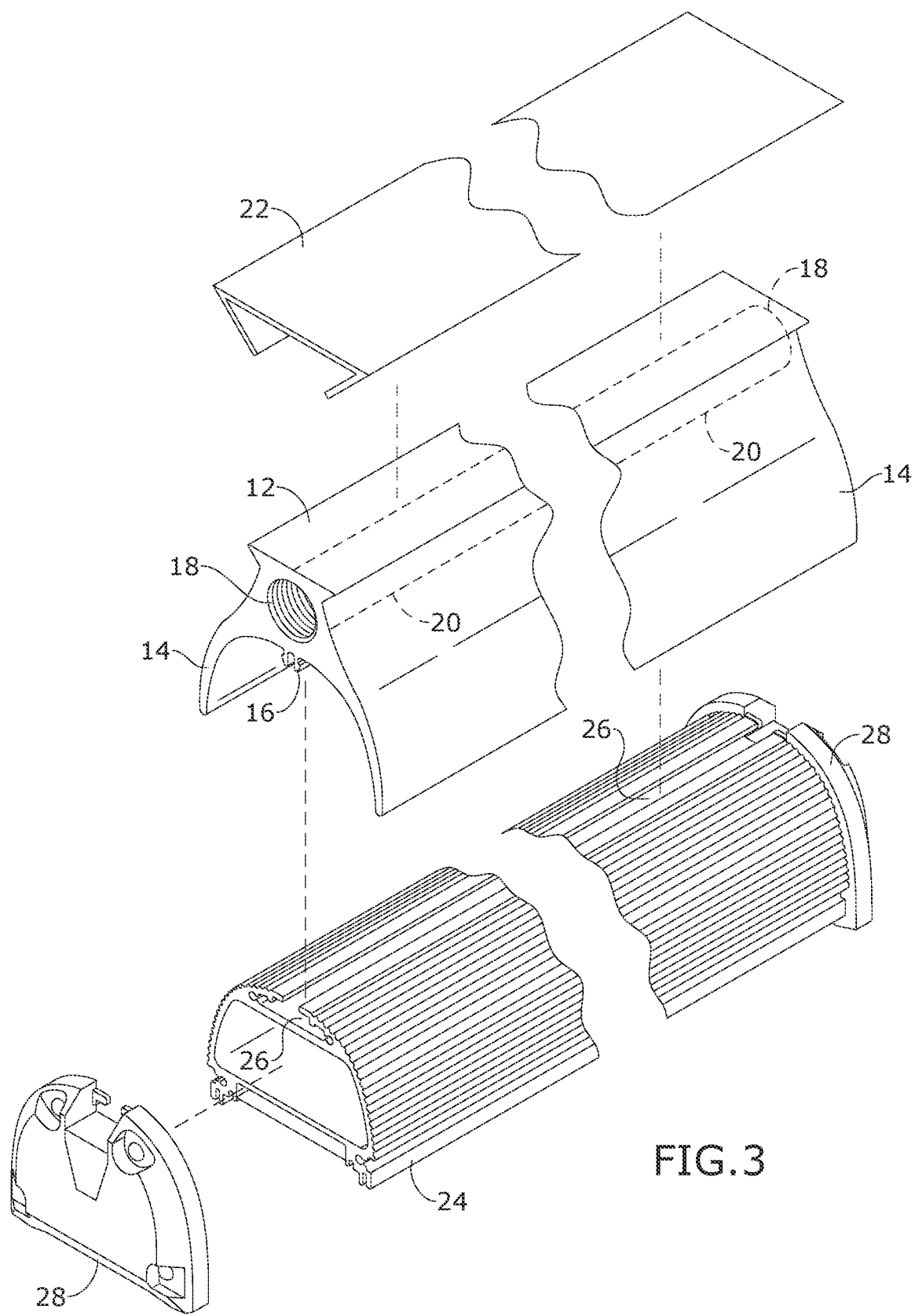
FIG. 3 is an exploded view of the contact heat exchange converter with clip 22 and fixture 24.
Figure 4:
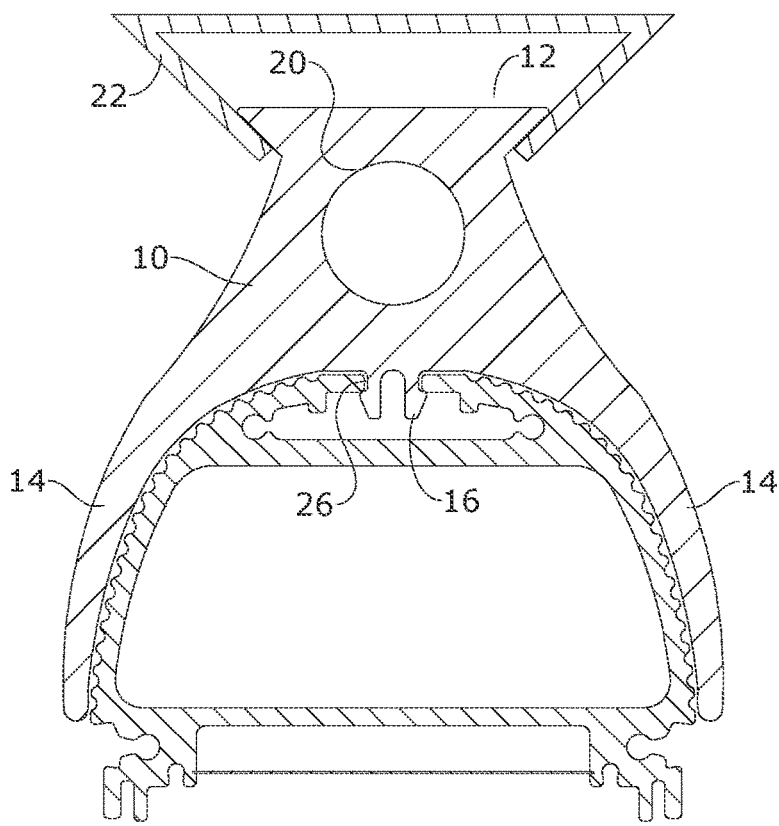
FIG. 4 is a section view of the contact heat exchange converter, taken along line 4-4 in FIG. 1.
Figure 5:
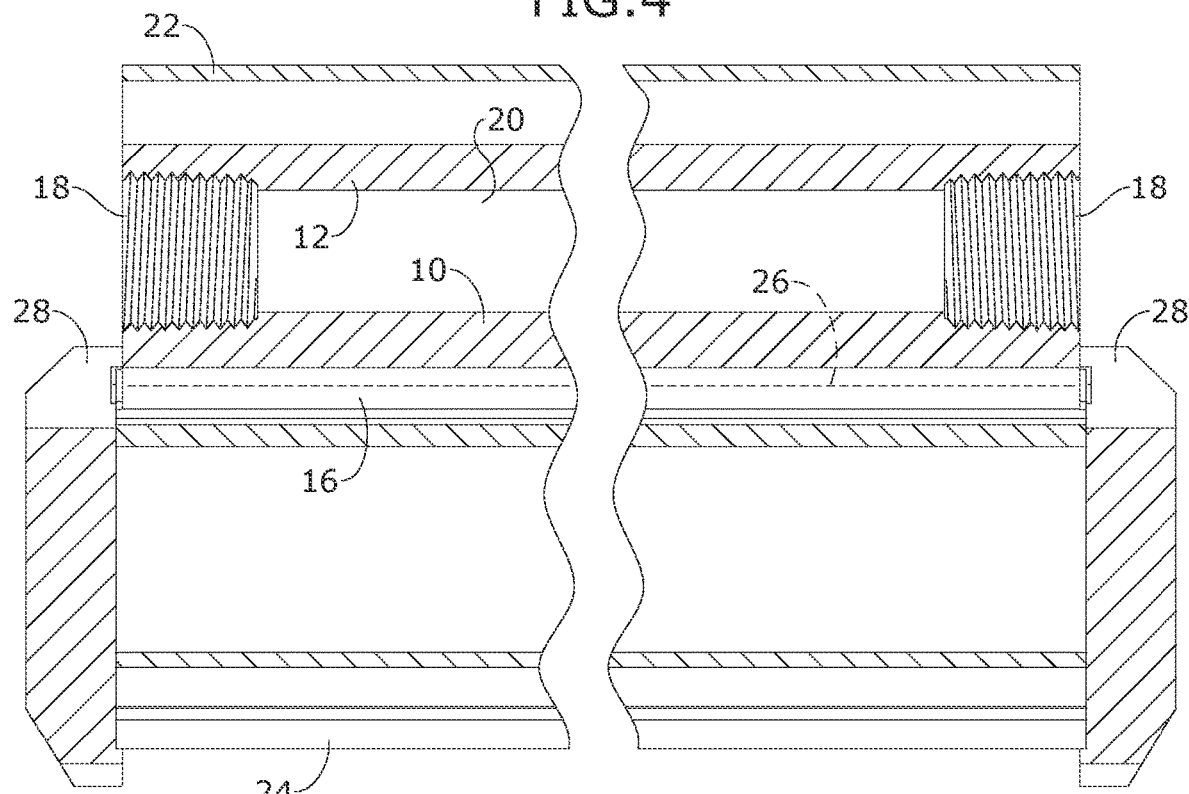
FIG. 5 is a section view of the contact heat exchange converter, taken along line 5-5 in FIG. 1.
Figure 6:
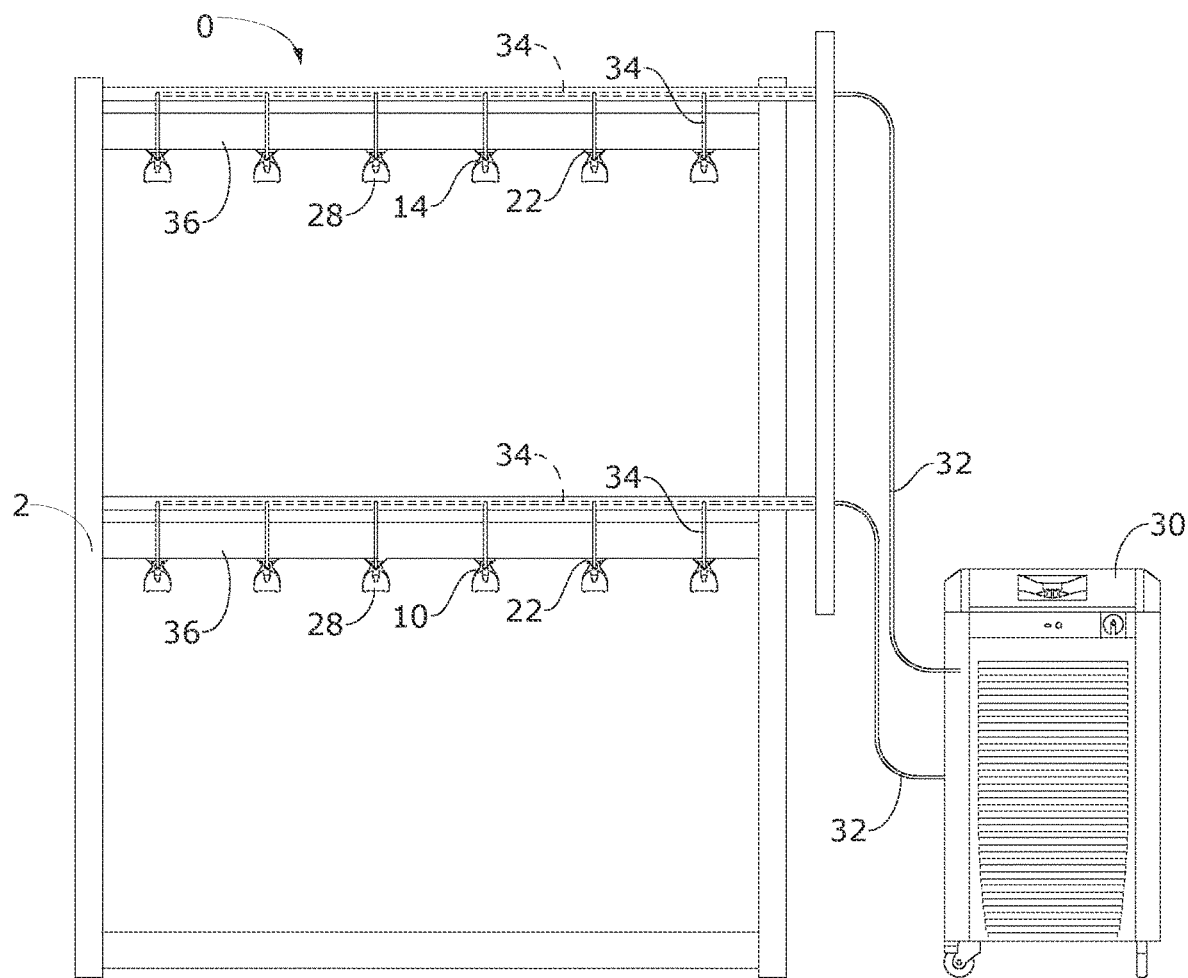
FIG. 6 is a schematic view of an exemplary installation of the contact heat exchange converter in a tiered rack growth system.
Figure 7:
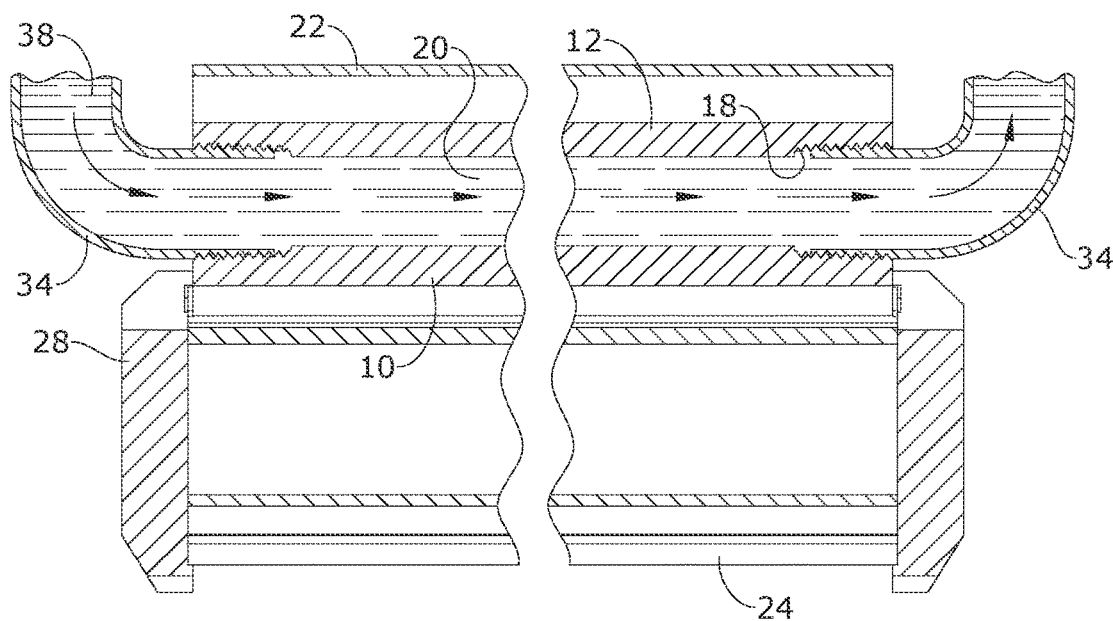
FIG. 7 is a section view of the contact heat exchange converter, illustrating the flow of a dense medium coolant thought a circulation conduit.

Broadly, embodiments of the present invention provides a system, apparatus, and method for thermal regulation in an illuminated growth environment. Aspects of the invention allow a tiered rack growth system 40, seen in the non-limiting embodiment of FIG. 6 to achieve optimized thermal capability of close tier level proximity between a plurality of tier tables 36 stacked in a frame 42 of the tiered rack system 40 and maximum plant growth height.

The contact heat exchange converter 10 has been developed to remove the light fixture 24 heat directly from a surface of a prefabricated light fixture 24 to eliminate the need for excessive air volumes along with increasing air flow difficulty within each length of tier tables 36. The small size of the contact heat exchange converter 10 negligibly impacts the space volume of the tiered rack system 40. It also provides the same thermal removal for each light fixture 24 location within the tiered rack growth system 40, allowing a homogenous room temperature to be achieved. The contact heat exchange converter 10 utilizes a cooled thermal mass to remove heat directly from the thermal sink surface of the light fixture 24.

The contact heat exchange converter 10 changes the light fixture 24 from an external surface convective heat transfer cooling system, utilizing air, to an internal conduction/convection heat transfer system, utilizing water or similar dense medium coolant 38. The dense medium coolant 38 is circulated by a coolant circulation pump 30.

The contact heat exchange converter 10 couples to a prefabricated light fixture 24, changing the method heat is dissipated from the light fixture 24 by utilizing the mass of both the contact heat exchange converter 10 and the mass of the light fixture 24 to provide a substantial heat sink.

The contact heat exchange converter 10 increases a thermal mass of the light fixture 24 from 4.699 lbm to 12.230 lbm by adding a contoured, mechanically attached 7.53 lbm (40" long) heat exchange converter 10, changing the major heat transfer medium from air to a dense medium coolant 38. Changing the major cooling medium from air to the dense medium coolant 38 allows greater heat transfer per unit volume of coolant medium.

Operating the contact heat exchange converter 10 and light fixture 24 with the appropriate dense medium coolant 38 flow rate & temperature, creates a significant cool thermal mass (heat sink) to remove the heat created by the LED lights carried in the light fixture 24, such that the ambient temperature around the operating unit 40 can be changed to a desired set point by adjusting a converter inlet dense medium coolant temperature. Internal fluid flow and temperature are operated by a coolant circulation pump 30 such that a 1° F.-2° F. temperature differential is held across the contact heat exchange converter 10 allowing the increased thermal mass, held at a significantly cooler temperature, to absorb the LED heat generated by the light fixture 24.

Utilizing the contact heat exchange converter 10 in tiered grow system 40 decouples the approach to sensible space cooling and space dehumidification (latent heat removal) and allows for significant energy savings at low relative humidity's if designed properly.

The contact heat exchange converter 10 length may vary from 40" to 48" depending on installed mounting constraints and requirements of the overall growing system 40. The contact heat exchange converter 10 length may be adjusted and/or limited by potential fluid couplings anticipated to mount the converter light fixture 24 to the tiered rack growth system 40.

As seen in reference to the drawings of FIGS. 1-5, the contact heat exchanger 10 is formed as an elongate body having a top flange 12 defined along a top end of the contact heat exchange body 10. The top flange 12 is shaped as a keyed protrusion extending from the top end of the heat exchange body 10. Arcuate divergent side arms 14 extend downwardly and outwardly from the top end of the contact heat exchange body 10. The arcuate divergent side arms 14 defining a contact thermal exchange cavity adapted to receive a light fixture 24 therein wherein a thermal sink of the light fixture 24 is held in contact with the contact thermal exchange cavity 25.

A center post 16 protrudes from an inner arch of the contact heat exchanger body 10 between the arcuate divergent side arms 14. 16. The center post 16 may extend along a longitudinal length of the contact heat exchange converter 10. The center post 16 is configured to couple with a slot 26 defined in a top of the light fixture 24 to removably mount the light fixture 24 in the contact heat exchange converter 10. End caps 28 may be removably secured to the ends of the contact heat exchange converter 10.

A fluid conduit 20 is defined in the top flange 12 and extends through the longitudinal length of the contact heat exchange converter 10. The fluid conduit 20 may be provided with a fitting 18, such as a threaded aperture, to operatively connect a fluid circulation feed line 32 communicating the dense medium coolant 38 with the coolant circulation pump 30.

The top flange 12 is adapted to couple with a corresponding keyed slot of a mounting clip 22. The mounting clip 22 attaches to a lower surface of tier table 36 to permit the contact heat exchange converter 10 to be removably attached the tiered rack growth system 40 in a snap fit configuration.

Non-limiting embodiments of the contact heat exchanger 10 may be constructed in various lengths according to the following characteristics:

40" long Contact Heat Exchange Converter 10:
Material—aluminum
Density: 0.0979 lbm/in$^3$
Specific Heat: 0.217 Btu/lbm-° F.
Light Fixture: 130-Watt, aluminum frame
Convertor cross-sectional area: 1.9231 in$^2$
Convertor Volume: 76.9240 in$^3$
Convertor weight: 7.53 lbm
Convertor—Light frame weight: 12.23 lbm
Convertor Surface Area: 507.5 in$^2$
Convertor—Light Contact Surface Area: 180 in$^2$
Convertor External Heat Transfer Convective Surface: 327.5 in$^2$
Added mass per in$^2$ of light emitting area: 0.0896 lbm/in$^2$; (12.9 lbm/ft$^2$)
Total Convertor—Light mass per in$^2$ of light emitting area: 0.1456 lbm/in$^2$; (20.97 lbm/ft$^2$)

Added mass per 100 watts of light emitted: 0.0579 lbm/watt; (5.79 lbm/100 watts)
Total Convertor—Light mass per 100 Watt of light emitted: 0.0941 lbm/watt; (9.41 lbm/100 watts)
47.5" long Converter:
Material—aluminum
Density: 0.0979 lbm/in$^3$
Specific Heat: 0.217 Btu/lbm-° F.
Light Fixture: 130-Watt, aluminum frame
Convertor cross-sectional area: 1.9231 in$^2$
Convertor Volume: 91.34 in$^3$
Convertor weight: 8.94 lbm
Convertor—Light frame weight: 13.64 lbm
Convertor Surface Area: 602.65 in$^2$
Convertor—Light Contact Surface Area: 213.75 in$^2$
Convertor External Heat Transfer Convective Surface: 388.91 in$^2$
Added mass per in$^2$ of light emitting area: 0.1064 lbm/in$^2$; (15.33 lbm/ft$^2$)
Total Convertor—Light mass per in$^2$ of light emitting area: 0.1624 lbm/in$^2$; 23.38 lbm/ft$^2$
Added mass per 100 watts of light emitted: 0.0688 lbm/watt; (6.88 lbm/100 watts)
Total Convertor—Light mass per 100 Watt of light emitted: 0.1049 lbm/watt; (10.49 lbm/100 watts)

Since the contact heat exchange converter 10 external surface remains as an exposed surface to the plant environment, the surface of the contact heat exchange converter 10 adds an additional cooling capability to the local ambient area.

Air movement at or near the plant locations helps to prevent mold or contaminant growth on the plants. In rack local fans can be used to augment the in-rack cooling effectiveness with localized air distribution parallel to the longitudinal axis of the contact heat exchange converter 10 while addressing the local air movement needs.

In use, the dense medium coolant 38 is circulated throughout the system by the coolant circulation pump 30. The coolant circulation pump 30 is provided with a heat exchanger and controls to select a desired temperature for the dense medium coolant 38. The dense medium coolant 38 is carried via the fluid circulation feed line 32 to the inlet 18 of the contact heat exchange converter 10. The dense medium coolant 38 is circulated through the fluid conduit 20 to extract thermal energy from the contact heat exchanger converter 10 and carried back to the coolant circulation pump 30 for removal of the thermal energy by the heat exchanger.

It should be understood, of course, that the foregoing relates to exemplary embodiments of the invention and that modifications may be made without departing from the spirit and scope of the invention as set forth in the following claims.

What is claimed is:

1. A contact heat exchange converter adapted to receive a light fixture for a tiered rack growth system, comprising:
an elongate body having a first end, a second end, a top, and a bottom, the elongate body having a substantially wishbone shaped cross section;
a flange protrudes from an apex of the elongate body and extends along a longitudinal length of the elongate body,
a pair of divergent side arms forming legs of the wishbone shaped cross section and transition to the apex, the pair of divergent side arms defining a contact thermal exchange cavity within an interior surface of the pair of divergent side arms, the interior surface dimensioned for heat conducting contact with a thermal sink of the light fixture; and
a fluid conduit extends through the flange and is adapted to receive connections to a dense medium coolant source for circulation through the elongate body.

2. The contact heat exchange converter of claim 1, further comprising:
a keyed protrusion extends from the flange, the keyed protrusion adapted to couple to with a mounting clip to secure the contact heat exchange converter within the tiered rack growth system.

3. The contact heat exchange converter of claim 1, further comprising:
a center post protruding from an apex of the contact thermal exchange cavity, the center post adapted to couple with a slot defined in the thermal sink of the light fixture.

4. The contact heat exchange converter of claim 1, wherein the elongate body increases a thermal mass of the light fixture by at least 7 lbm.

5. The contact heat exchange converter of claim 1, wherein the elongate body increases a thermal mass of the light fixture by at least 7.531 lbm.

6. A tiered rack growth system, comprising:
a light fixture having an arcuate thermal sink defined in top surface thereof;
a contact heat exchange converter having a wishbone shaped cross section;
a contact thermal exchange cavity defined within the wishbone shaped cross section, the contact thermal exchange cavity dimensioned to cooperatively receive the arcuate thermal sink in abutment with an inner surface of the wishbone shaped cross section; and
a circulation conduit extending through an apex of wishbone shaped cross section is adapted to receive connections to a dense medium coolant source for circulation of a dense medium coolant through the circulation conduit.

7. The tiered rack growth system of claim 6, further comprising:
a coolant circulation pump in communication with the circulation conduit, the coolant circulation pump configured circulate the dense medium coolant through the circulation conduit such that a 1° F.-2° F. temperature differential is held across the contact heat exchange converter.

8. The tiered rack growth system of claim 7, further comprising:
a fluid circulation feed line in fluid communication between the circulation conduit and the coolant circulation pump.

9. The tiered rack growth system of claim 6, further comprising:
a keyed protrusion extending from a flange defined along the apex of the contact heat exchange converter, and
a mounting clip adapted to attach to a tier shelf, the mounting clip having a keyed slot to cooperatively receive the keyed protrusion to removably secure the contact heat exchange converter to the tier shelf.

10. The tiered rack growth system of claim 6, further comprising:
a post extending along a longitudinal axis of the contact thermal exchange cavity, and a slot extending along a longitudinal length of the light fixture, the slot configured to receive the post to secure the light fixture within the contact thermal exchange cavity.

\* \* \* \* \*